Aug. 27, 1935. P. A. NIRDLINGER 2,012,284
PORTABLE SURGICAL LAMP
Filed Dec. 29, 1933 4 Sheets-Sheet 2
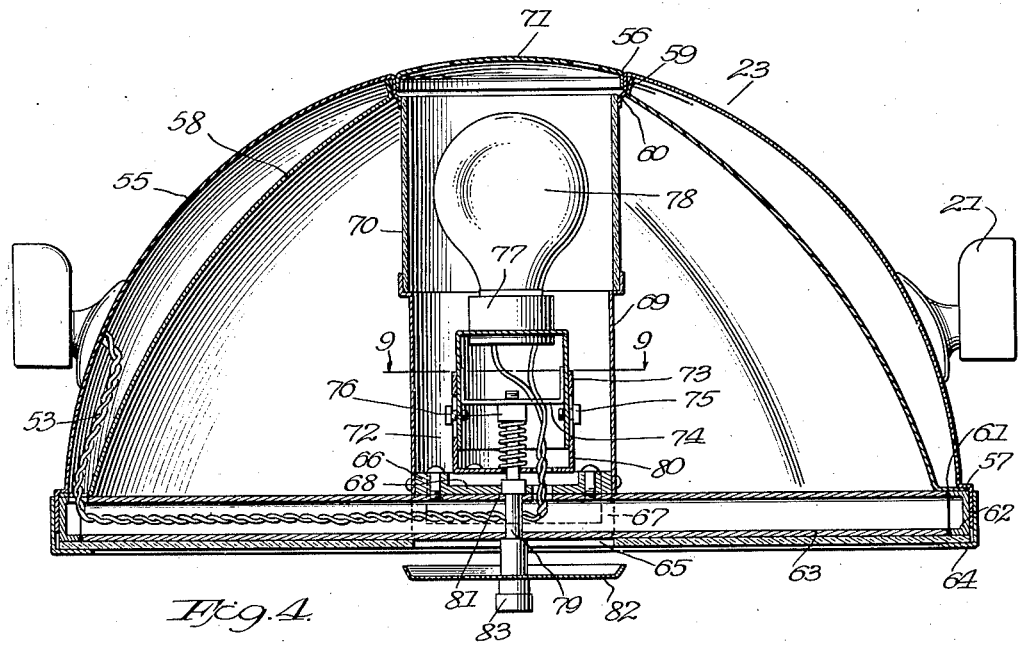
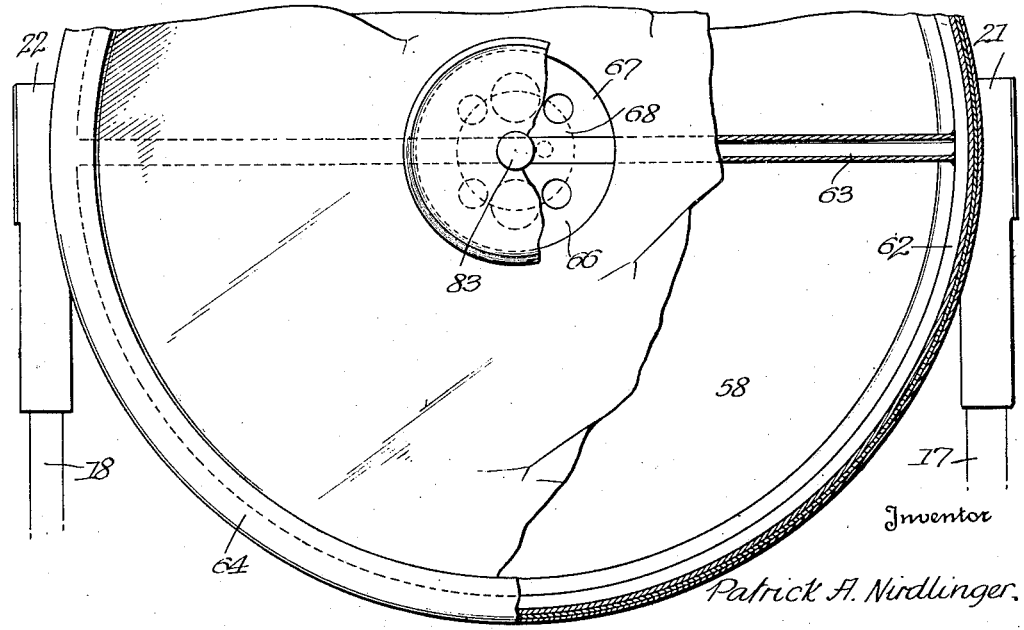
Inventor
Patrick A. Nirdlinger.
By Cushman Darby Cushman.
Attorneys Aug. 27, 1935.   P. A. NIRDLINGER   2,012,284
PORTABLE SURGICAL LAMP
Filed Dec. 29, 1933    4 Sheets-Sheet 3
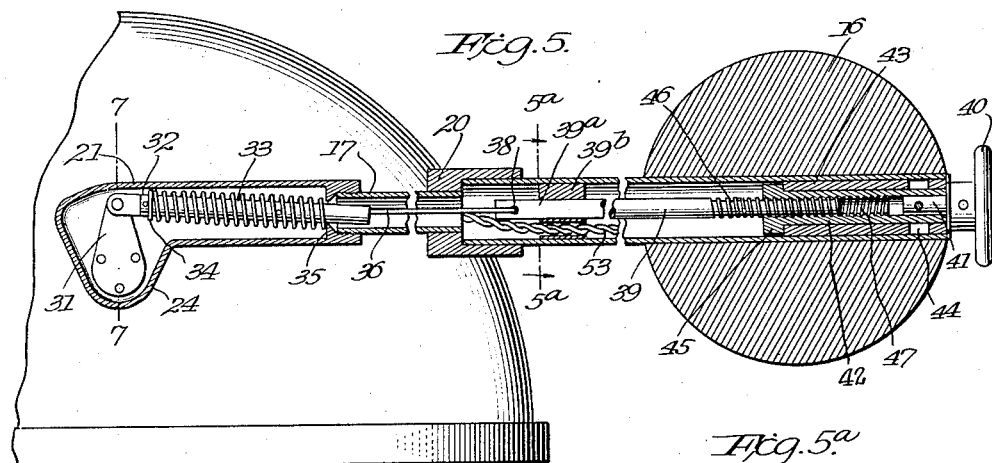
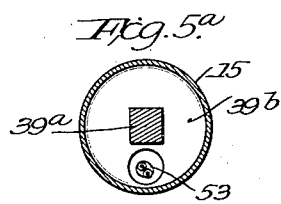
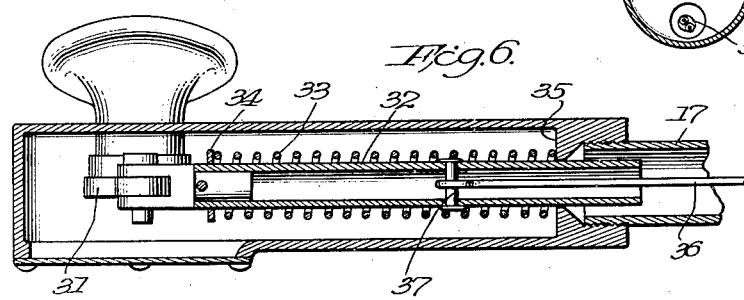
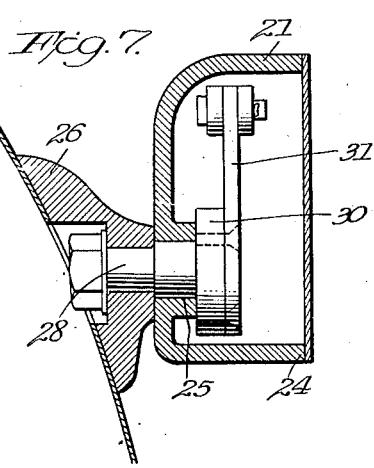
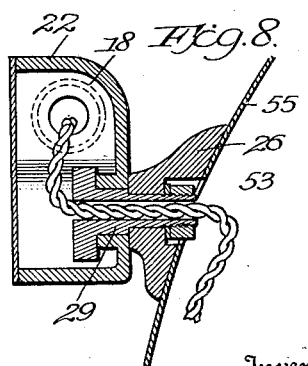
Inventor
Patrick A. Nirdlinger
By Cushman Darby & Cushman
Attorneys

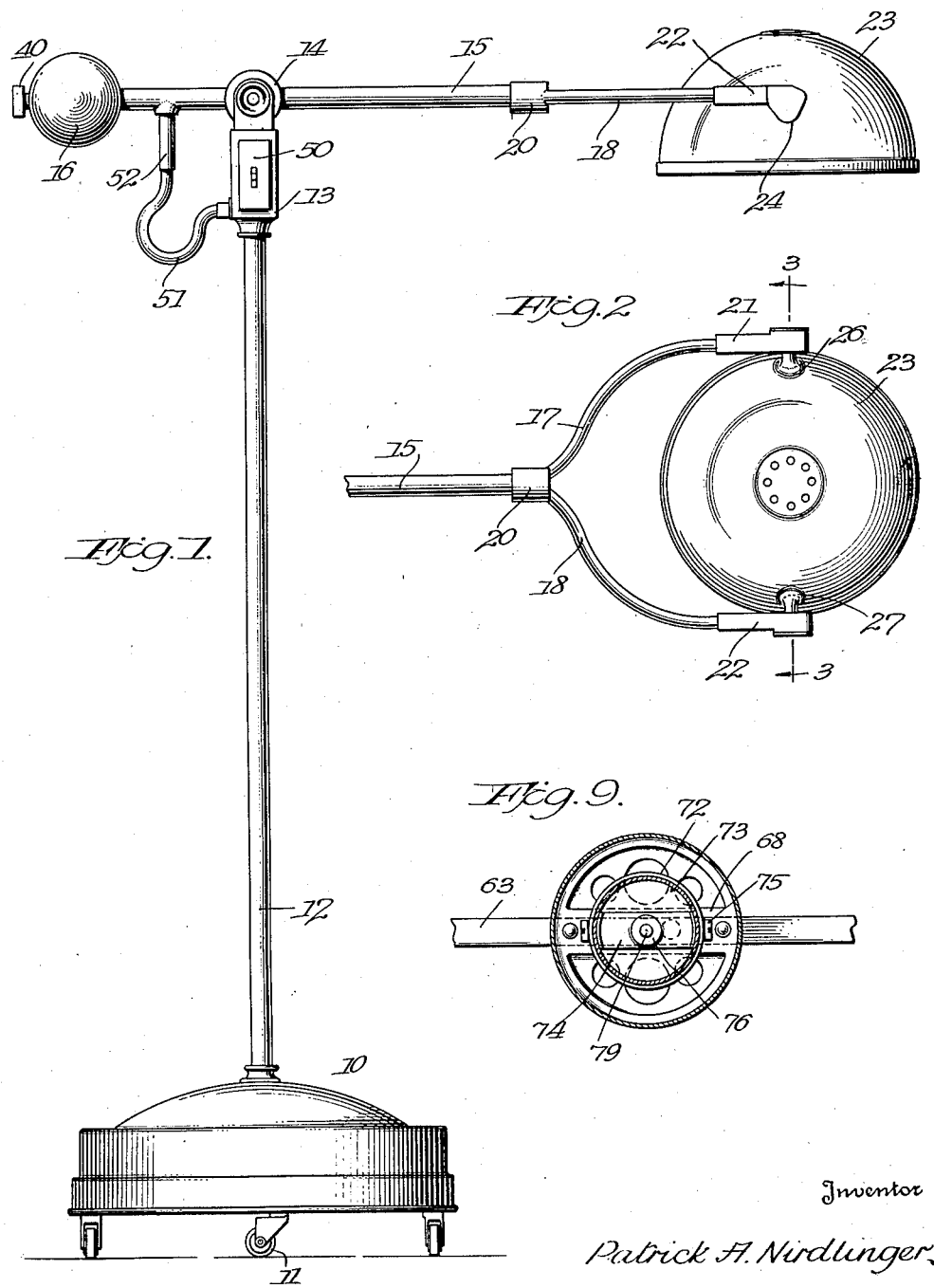

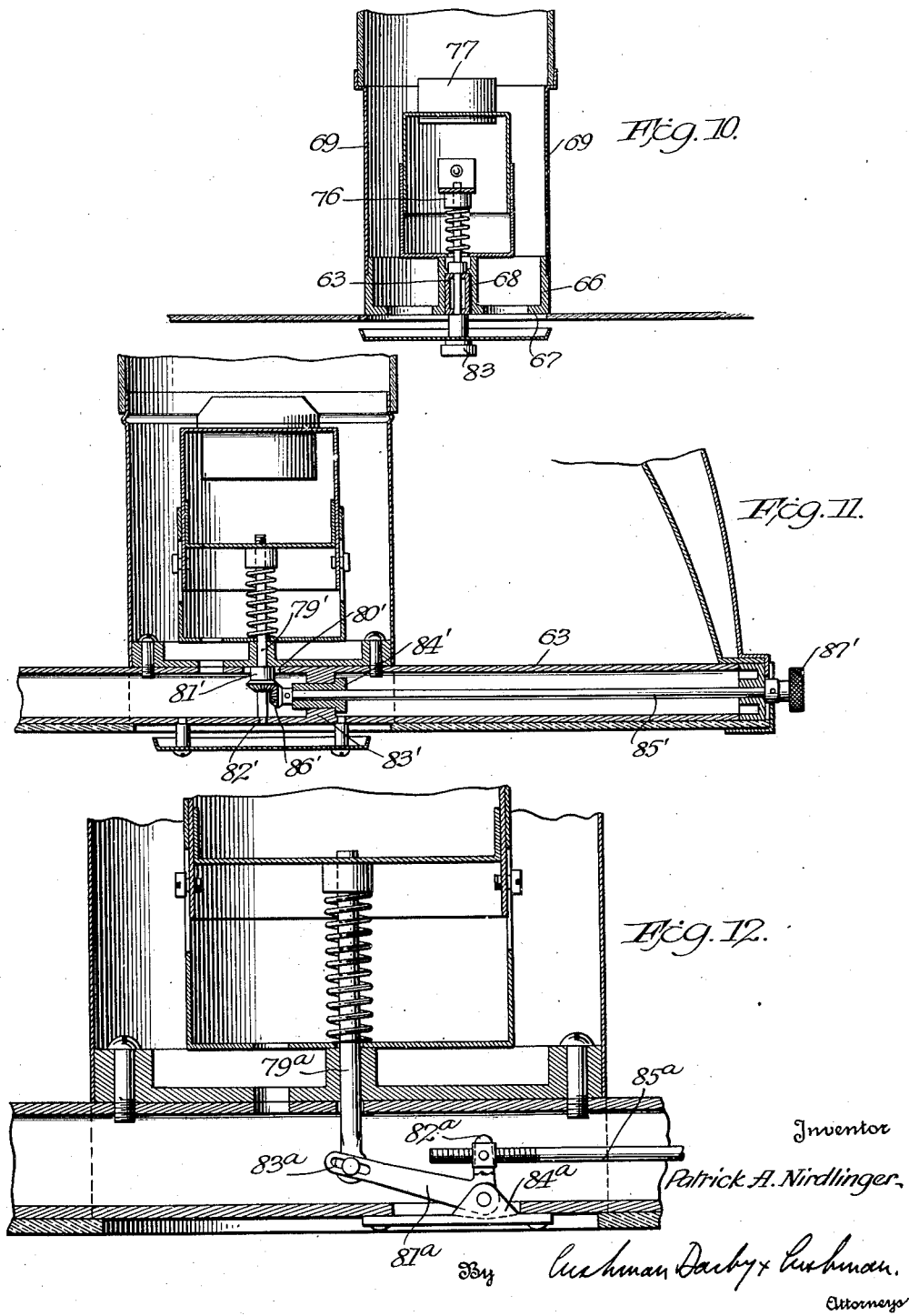

Patented Aug. 27, 1935

2,012,284

UNITED STATES PATENT OFFICE 2,012,284

PORTABLE SURGICAL LAMP

Patrick A. Nirdlinger, Madison, Wis., assignor to Operay Laboratories, Inc., Madison, Wis., a corporation of Wisconsin Application December 29, 1933, Serial No. 704,577

17 Claims. (Cl. 240—1.2)

This invention relates to surgical lamps, or to lamps peculiarly adapted for use in operating rooms, dispensaries, clinics and the like. More particularly it relates to a lamp of this general class which is portable and adjustable, so that a beam of light may be projected to any desired point.

It is a primary object of the present invention to simplify and improve devices of this kind. More particularly, it is an object of the invention to provide improved means for adjusting the lamp projector in any direction, which means may be controlled by an attendant positioned at a point remote from the projector itself.

It is a further object of the invention to provide novel supporting means for the projector so that it may be adjusted to project its beam in any direction. Furthermore, the mechanical connections between the projector and the operating handle or handles may be concealed from view, so that no unnecessary parts are exposed in the operating room, and the sanitary characteristics of the device are thereby improved. Also the external appearance of the device is thus simplified and made pleasing to the eye.

An important phase of the invention relates to the construction of the light projector itself. With respect to this phase of the invention, it is an object to provide a device in which a major portion of the heat generated by the source of light will not be projected with the light upon the patient being illuminated, but will be projected and dissipated in an opposite direction.

It is a further object of the invention to provide novel ventilating means for the interior of the lamp so that the bulb and other parts therein will not become overheated.

It is a further object to provide novel supporting means for the bulb and socket, whereby a rugged construction is provided. Associated with the supporting means, it is sometimes desirable to provide means for adjusting the position of the bulb to vary the focus of the projector, and it is therefore an object of this invention to provide a simple and satisfactory device for this purpose.

Other and further objects and advantages of the invention will become apparent from a consideration of the following description of the illustrative embodiment of the invention, shown in the accompanying drawings, in which:

Figure 1 is a side elevation of a surgical lamp constructed in accordance with the invention.

Figure 2 is a top plan view of the projector and supporting fork.

Figure 3 is a vertical sectional view of the projector.

Figure 4 is a fragmentary bottom plan view, partly in section of the projector.

Figure 5 is a sectional view, with parts broken away, showing the operative connections for tilting the projector on its pivoting axis.

Figure 5a is a sectional view on line 5a—5a of Figure 5.

Figure 6 is a horizontal sectional view of a portion of Figure 5.

Figure 7 is a transverse vertical sectional view taken on line 7—7 of Figure 5, showing the pivotal connection on one side of the projector.

Figure 8 is a similar view taken through the pivotal connection on the other side of the projector.

Figure 9 is a horizontal sectional view, taken on line 9—9 of Figure 3, showing certain details of the lamp mounting.

Figure 10 is a fragmentary view similar to Figure 3, but taken on a plane extending at right angles to the plane of Figure 3.

Figure 11 is a fragmentary view similar to Figure 3 showing a modified form of means for adjusting the focus of the lamp.

Figure 12 is a similar view, showing still another modification.

Referring to Figure 1, the lamp of the present invention is preferably mounted upon a base 10 having casters 11 which permit its ready removal from place to place as desired. A vertical post 12 projects upwardly from the base and is provided at its upper end with a bracket 13. This bracket may be rotatably mounted on the post 12, for instance by a screw thread, or any other convenient construction, so that the bracket may be turned through one complete rotation. In some cases it may be found desirable to have the bracket 13 rigidly mounted on the post and to provide the rotatable connection at the lower end of the post where it is secured in the base 10. Either construction is within the scope of my invention.

The bracket 13 includes a ball and socket universal joint connection represented generally by reference character 14, which may conveniently be in the form of the joint shown in my prior Patent 1,901,527, granted March 14, 1933.

A substantially horizontal bar 15 is carried in the joint 14 for limiting universal movement about the center of that joint. This bar has a counterweight 16 secured to one of its ends, and a fork comprising arms 17 and 18 secured to its other end. The bar and both of the fork arms are preferably hollow and the interior bores thereof are in communication through the connecting sleeve 20. The outer ends of each of the fork arms are provided with housings 21, 22 in which the lamp projector 23 is pivotally mounted, by means now to be described.

Each of the housings is formed with an offset portion, or enlargement 24, and in the wall of this enlargement a bearing aperture 25 is disposed. The lamp projector 23 has, on opposite sides of its outer surface, a pair of brackets 26, 27 (Figure 7) and outwardly extending trunnions 28, 29 secured therein. These trunnions project into and through the bearings 25 and permit tilting of the light projector with respect to the fork and the housings 21, 22.

Referring to Figures 5 to 7 inclusive, it will be noted that the trunnion 28 is provided with an enlargement 30 on the end disposed within the housing 21. A short lever 31 is secured to the enlargement and has its upper end extending upwardly near the top of the housing 21, offset from the pivoting axes in the bearings 25. A link 32 is pinned to the end of the lever and projects rearwardly therefrom toward the rear end of the housing. A compression spring 33 surrounds the link and bears at one end against an abutment washer 34, or the like, and at the other end against the rear inner face 35 of the housing. Thus, the spring tends constantly to force the lever 31 in a counter-clockwise direction in Figure 5.

A convenient means for effecting tilting movement of the light projector by remote control is disclosed in the drawings. Obviously, many variations in the specific arrangement may be resorted to without departing from the invention. A wire 36 is shown as being connected to the link 32, for instance, by a pin 37. The wire is threaded rearwardly through the fork arm 17, through the sleeve 20 into the interior of bar 15. The inner end of the wire is connected, through a hole 38 or some other convenient connection, to the angularly shaped end 39a of a rod 39. This end of the rod is slidably mounted in a bushing 39b having an angular bore, and fixed in the interior of bar 15. The other end of the rod 39 is connected by a suitable threaded connection to an operating handle 40 positioned at the end of the bar 15, outwardly of the counter-weight 16. This threaded connection may be in the form disclosed in Figure 5, but any equivalent construction may be employed without departing from the invention. In the arrangement of parts illustrated, the handle 40 is secured to a stem 41 which is pinned to an internally threaded sleeve 42. A bushing 43 is secured in the end of the tube 15 and constitutes a bearing for the sleeve 42. The bushing has a pair of diametric apertures 44, which facilitate insertion of the pin connecting the stem 41 to sleeve 42. The sleeve 42 has, on its inner end an enlarged head which abuts the bushing 43 and prevents withdrawal of the parts therethrough.

The rod 39 has a screw thread 46 formed on its end, which cooperates with an interior thread 47 in the sleeve. Thus, rotation of the handle 40 will impart longitudinal movement to the rod 39, because the latter is restrained from rotation by bushing 39b. This movement in one direction will be transmitted through the wire 36 to the link 32, with the result that the lever 31 will be pulled backwardly against the action of spring 33, to tilt the light projector. Rotation of the handle 40 in the opposite direction will permit the spring to expand and tilt the lamp projector in the other direction.

It will thus be seen that the light projector of the present invention may be moved in any direction for adjustment purposes. As stated above, the bracket 13 is mounted for rotation about a vertical axis. The joint 14 is such that the bar 15 may be oscillated about its own axis to tilt the projection from side to side. Also the bar may be rocked about a horizontal axis extending at right angles to its own axis, to raise and lower the projector. These movements may be effected by an attendant manipulating the handle 52, which depends from the bar 15 at a point remote from the light. The means which permit the projector to be tilted about the pivoting axis of the trunnions 28, 29 complete the universally adjustable mounting of the projector, and make it capable of a wide variety of uses.

The electrical connections for the lamp positioned in the projector 23 have been constructed and arranged in a novel manner in the present device. A cable from an appropriate source leads to the base 10 and wires extend therefrom up through the vertical post 12. A switch 50, preferably of the mercury tube type, is carried by the bracket 13, and the electric wires lead through a flexible cable 51 from the switch upwardly through the operating handle 52 to the interior of the bar 15. The wires run lengthwise in the hollow bore of the bar and are threaded through the hollow fork arm 18, which is the arm that does not carry the operating wire 36.

Referring to Figure 8 it will be seen that the electric wire 53 extends into the housing 22 and is threaded through the hollow trunnion 29 into the interior of the casing of the lamp projector. Thus, the wires are substantially completely hidden from view.

The construction of the light projector is an important part of the present invention. A substantially semi-spherical casing 55 is provided with an axial aperture 56, for purposes to be described below, and an offset seat 57 around the periphery of its open end. A reflector 58 is disposed interiorly of the casing in spaced relation thereto. It is provided with a flange 59 which bears against the casing flange 60 adjacent the axial aperture. The outer end of the reflector is provided with a conventional flange 61 adapted to be received on the seat 57.

An annular rim 62, formed from a channel section is provided with a diametrically disposed hollow bar 63 which is preferably welded thereto. A glass cover plate may be clamped in place outside of the annular rim and bar by means of a clamping ring 64, or its equivalent. This cover plate is preferably made of glass, or some other transparent or translucent material, and is centrally apertured, as at 65, for purposes to be described below.

A cup-like base 66 is mounted upon the bar 63 and has its outer end disposed adjacent the glass cover plate. Referring to Figures 3 and 10, it will be seen that the member 66 has a cylindrical wall, a perforated lower end 67 and a diametric channel part 68. The part 68 embraces the bar 63 and serves as a means for securing the member in place. As shown in Figure 10, the member 66 substantially contacts the glass cover plate around the circumference of the opening therein.

The cup-like member constitutes a convenient means for securing a ventilating housing, or heat screen within the lamp. This housing preferably comprises an opaque cylindrical member 69 having its lower end mounted upon the base 66. The upper end of opaque member 69 supports the other part of the housing, which is in the form of a cylindrical translucent or transparent screen 70. The upper end of the latter is received in and held by the flange 60 of the casing 55. An appropriate perforated cap 71 is used as a cover plate. Since the upper and lower ends of the ventilating housing are secured in contact respectively with the casing 55 and the glass cover plate, it is apparent that the reflector 58 and the inner surface of the glass cover plate are effectively protected from contamination by dust carried upwardly through the ventilating housing by the draft of air passing therethrough.

The apertured base 66 also serves as a support for the adjustable bulb mounting which is preferably used in connection with the present invention. This mounting comprises a cup 72 in which is telescopically secured a second cup or sleeve 73. The latter is provided with a bridge 74 extending diametrically across the same. Headed pins 75 extend outwardly from the inner sleeve 73 and ride in appropriate slots formed in the outer cup. The bridge 74 is centrally apertured and has a nut 76 secured thereon. A conventional bulb socket 77 is mounted on the upper end of the cup 73, and receives a bulb 78.

An adjusting screw 79 is rotatably mounted in the bar 63, and its inner, threaded end extends upwardly into threaded engagement with the nut 76 on the bridge 74. An appropriate compression spring 80 is disposed between the cup 72 and the nut 76.

It will readily be seen that rotation of the adjusting screw 79 will impart linear movement to the cup 73 and the bulb 78, to change the position of the latter with respect to the focal point of the reflector.

The adjusting screw 79 is provided with an outwardly projecting flange 82 which may be a separate element, or an integral part of the screw. This flange extends radially outwardly from the screw beyond the margins of the aperture 65 of the glass cover plate. In many cases, the knurled head 83 of the adjusting screw may be omitted, and the flange 82 used as a convenient means for rotating the screw.

The primary purpose of the flange 72, however, is to serve as a dust catching cover plate for the opening in the face of the projector lens. The flange prevents dust from falling downwardly through the cylindrical housing in the projector onto the patient under the surgical lamp.

In Figures 11 and 12, two modified forms of adjusting means for the lamp bulb and socket are disclosed. These constructions will be found to be advantageous in many cases, because they permit adjustment of the focus of the light projector from a point outside of the beam of light being projected. Referring to Figure 11, it will be seen that the adjusting screw 79' projects through an enlarged opening 80' in the bar 63, and is provided with a bevelled gear 81'. The lower end of the screw 79' is reduced in size and is received in a small bearing aperture 82' in the lower surface of the bar 63. A seat 83', which may be integral or a separate part, is provided interiorly of bar 63, and the same carries a bushing 84'. This bushing acts as a bearing for a rotatable rod 85', which carries on its inner end, a bevelled gear 86', and on its outer end a knurled handle 87'. It will be apparent that the position of the bulb socket 77' may be varied by rotating the handle 87', through movement transmitted to the screw 79' by the bevelled gears 81', 86'. This adjustment may be accomplished without the necessity of the attendant placing his hand within the beam of light projected by the device.

In Figure 12 a similar arrangement is disclosed, except a bell crank lever 81a is substituted for the bevelled gears. The threaded connection is provided between the operating rod 85a and one end 82a of the bell crank. The other arm of the bell crank is slotted at 83a, to permit reciprocating movement to be imparted to the vertical rod 79a. In order to permit easy assembly of the parts, the bell crank is preferably mounted on a plate 84a secured to the lower surface of the bar 63.

The construction and the arrangement of parts of the light projector shown in Figure 3 constitute a novel means for minimizing the amount of heat radiated and projected by the bulb 78 to the reflector 58 and reflected and projected therefrom to the patient being illuminated. In the first place, a substantial amount of heat will be carried away by a draft of air flowing through the ventilating housing 69, 70. When the projector is in normal position, air will flow inwardly through the aperture 65 to the interior of the housing 69 and upwardly therein through the aperture 67 in base 66. The air will continue to flow upwardly in the cylinder 70 past the bulb 78 and out through the cap 71. A large proportion of the heat generated by the bulb will be carried away by this draft, and the lamp will therefore operate at a cooler temperature than an unventilated lamp.

Infra-red rays and other heat waves radiated by the bulb 78 will largely be intercepted by the translucent or transparent cylinder 70 and the heat thereof will be transmitted by conduction to the flange 60 and casing 55, where it will be dissipated rearwardly to atmosphere. The screen 70 may be made of plain glass, or of material of special composition, peculiarly adapted to intercept and absorb infra-red rays.

In a surgical lamp it is not undesirable to have the back of the casing become heated, but it is highly undesirable to have heat rays projected from the front of the lamp upon the patient being illuminated. With the device of the present invention, substantially all of the heat is projected away from the rear side of the lamp, either by radiation from the casing 55, or by the draft of ventilating air issuing out through the cap 71. Substantially no heat is reflected downwardly by the reflector 58.

In some cases it may be desirable to interpose a heat insulating ring between the casing flange 60 and the adjacent flange 59 of the reflector, to prevent the conduction of heat from the casing to the reflector.

It is usually found desirable to construct a surgical lamp in such a manner that the light projected thereby is diffused and substantially shadowless. This may be accomplished in the present instance in a number of ways. The cover plate for the projector may be made from a sheet of mottled glass; or the reflector may be irregular; or the cylindrical screen 70 may be formed of light diffusing material. It will be apparent therefore that the cover plate or the cylindrical screen, or both, may be made of either translucent or transparent material. Where I use the term "translucent" in the claims, I use it in a generic sense, and intend to cover any light penetrative substance.

The base 10 may conveniently be used as a housing for an auxiliary source of electric current, so that the lamp will not be dependent upon the house current. Such an auxiliary supply usually is in the form of a transformer, trickle charger, and one or more storage batteries. An automatic relay switch may be provided to throw the battery into the line when the main source of current fails. or any other convenient device may be used.

It will be understood that the present invention is not limited to the details of construction shown in the accompanying drawings and described in this specification. Many modifications will occur to one skilled in the art, and all such modifications as fall within the scope of the appended claims, or their equivalents, are within the scope of the invention.

I claim:

1. A ventilated light projector comprising a reflector, a casing, a translucent cover plate for the reflector, a light socket adapted to support a bulb on substantially the focus of the reflector, and a cylindrical housing disposed in said casing with its axis on the optical axis of the reflector, said cover plate having an opening in communication with the interior of said cylindrical housing, said lamp casing having an opening in communication with the other end of said housing whereby air may flow through said cover plate into the interior of said cylindrical housing and outwardly therefrom through the opening in said casing to carry away heat generated by the bulb disposed therein.

2. A light projector comprising a substantially semispherical casing, a translucent cover plate positioned over the open side of the casing, a centrally disposed, two part cylindrical housing secured at one end to the casing and having its other end disposed adjacent the cover plate, said plate and casing having ventilating openings communicating with the interior of the cylindrical housing, one of the parts of said housing being opaque and the other translucent, and a source of light disposed in the translucent part of the housing whereby a draft of air through said housing is adapted to carry away heat generated by said source of light.

3. A lamp projector comprising an axially apertured casing, a reflector in the casing, an annular rim at the open end of the casing, a diametrically disposed bar carried by the rim, a centrally apertured translucent cover plate for the casing, a cylindrical housing carried by said bar in said casing and having its ends communicating respectively with the apertures in the casing and the cover plate and constituting a conduit for the dissipation of heat, a lamp socket supported by said bar in said housing, and a bulb in the socket, whereby a draft of air through said apertures and said cylindrical housing dissipates heat from said bulb.

4. A light projector comprising a casing, an annular rim at the front of said casing, a diametrically disposed bar secured to said rim, a centrally apertured translucent cover plate carried by the rim and disposed outwardly of the bar, a cylindrical housing secured to the inner face of said bar and having its inner end secured in heat exchange relation to the casing, a light socket and bulb mounted on said bar inside of said housing, said casing having an aperture communicating with the interior of said cylindrical housing to permit a draft of cooling air to flow through said housing past the bulb therein, said housing serving to intercept heat rays from said bulb and to dissipate the heat thereof by conduction to said casing.

5. A lamp projector comprising an axially apertured casing, a reflector in the casing, an annular rim at the open end of the casing, a diametrically disposed bar carried by the rim, a centrally apertured translucent cover plate for the casing, a bulb support carried by said bar, a bulb on the support remote from the bar and adjacent the reflector, an opaque shield surrounding said bulb support and carried by said bar and a translucent shield surrounding said bulb and carried by the first mentioned shield and secured in heat exchange relation at its inner end to said casing, said translucent shield being adapted to pass light rays to said reflector, but to intercept heat rays and conduct the heat thereof to said casing to be dissipated thereby, the apertures in said cover plate and casing permitting a draft of cooling air to flow through said shields and past said bulb.

6. A surgical lamp comprising a casing, a reflector in the casing, a translucent cover plate for the open end of the casing, a lamp bulb disposed in focal relation to the reflector, and means for minimizing the heat radiated and projected by said bulb to said reflector and thence reflected and projected to the object being illuminated, said means comprising a translucent screen extending from said cover plate to said casing and supported in heat exchange relation to the casing and surrounding said bulb, said screen having its opposite ends in communication with external atmosphere, whereby a draft of cooling air is caused to flow therethrough, to carry off a portion of the heat generated by said bulb, said screen serving to pass light rays to said reflector, but to filter out and intercept the major portion of infra-red and heat waves, and to conduct the heat thereof to said casing to be dissipated thereby.

7. A surgical lamp comprising a casing, a reflector in the casing, a lamp bulb disposed in focal relation to the reflector, and means for minimizing the heat radiated and projected by said bulb to said reflector and thence reflected and projected to the object being illuminated, said means comprising a translucent screen supported in heat exchange relation to said casing and surrounding said bulb, and ventilating means for the interior of said screen comprising openings communicating with atmosphere at opposite ends of the screen, whereby a draft of air is caused to flow through the screen from end to end thereof and past said bulb to cool the same, said screen being constructed and arranged to pass light rays to said reflector, but to filter out and intercept the major portion of infra-red and heat rays and to conduct the heat thereof to said casing to be dissipated thereby.

8. A lamp projector comprising an axially apertured casing, a reflector in said casing spaced therefrom, an annular rim at the open end of the casing, a diametrically disposed hollow bar carried by the rim, a centrally apertured translucent cover plate for the casing, a cylindrical housing carried by said bar in said casing and having its ends communicating respectively with the apertures in the casing and the cover plate, a lamp socket supported by said bar in said housing and a concealed electric wire extending from an external point through the casing into the space behind the reflector and thence through the hollow bar to the socket in the cylindrical housing, and a bulb in said socket, said housing and apertures constituting a conduit for dissipation of heat from the bulb.

9. A ventilated light projector comprising a reflector, a casing, a translucent cover plate for the casing, a light socket adapted to support a bulb on substantially the focus of the reflector, a cylindrical housing disposed in said casing with its axis on the optical axis of the reflector, said housing having its upper and lower ends secured in dust-proof relation respectively to said casing and said cover plate, said cover plate having an opening in communication with the interior of said housing, and said casing having an opening in communication with the other end of said housing, whereby air may flow through said cover plate into the interior of said cylindrical housing and outwardly therefrom through the opening in said cover plate to carry away heat generated by the bulb disposed therein, the connection between the ends of said housing and said casing and cover plate preventing the entry of dust to the area adjacent said reflector.

10. A surgical lamp comprising a casing, an annular rim at the front of the casing, a diametrically disposed tubular bar supported by said rim, a translucent cover plate carried by the rim and positioned exteriorly of the bar, an adjustably mounted bulb socket carried by the bar interiorly of the casing and cover plate, an adjusting member secured to said bulb socket and movably carried by said bar, and an operating knob operatively connected to said member and disposed exteriorly of said casing, whereby movement imparted to said knob may be transmitted through said member to change the position of said bulb socket.

11. A surgical lamp comprising a casing, an annular rim at the front of the casing, a diametrically disposed tubular bar supported by said rim, a translucent cover plate carried by the rim and positioned exteriorly of the bar, an adjustably mounted bulb socket carried by the bar interiorly of the casing and cover plate, an electric conduit extending from an external source through the interior of said tubular bar to said bulb socket and concealed from view thereby, a movable adjusting pin connected to said bulb socket and extending into the interior of said bar, and an operating knob disposed exteriorly of said casing and cover plate and operatively connected to said pin, whereby movement may be imparted to said pin by said knob to change the position of said socket.

12. A surgical lamp comprising a casing, an annular rim at the front of the casing, a diametrically disposed tubular bar supported by said rim, a translucent cover plate carried by the rim and positioned exteriorly of the bar, a cylindrical cup supported by said bar and disposed coaxially with said casing interiorly thereof, a bulb socket support telescopically mounted in said cup, a socket on said support, a movable adjusting pin connected to said socket support and projecting into the interior of said tubular bar, and an operating member having a part disposed exteriorly of said bar and operatively connected through said pin to said socket support, whereby the latter may be moved with respect to said cup to change the focus of said lamp.

13. A surgical lamp comprising an axially apertured casing, an annular rim at the front of the casing, a diametrically disposed bar supported by said rim, a centrally apertured translucent cover plate carried by the rim, a cylindrical ventilating housing axially disposed in the casing and supported by the bar and communicating with the apertures in the casing and the cover plate, an adjustably mounted bulb in the housing supported by the bar, and an adjusting screw secured to the bulb mounting and rotatably carried by the bar, said screw being projected through said cover plate in concentric spaced relation to the margins of the aperture therein.

14. A surgical lamp comprising an axially apertured casing, an annular rim at the front of the casing, a diametrically disposed bar supported by said rim, a centrally apertured translucent cover plate carried by the rim, a cylindrical ventilating housing axially disposed in the casing and supported by the bar and communicating with the apertures in the casing and the cover plate, an adjustably mounted bulb in the housing supported by the bar, and an adjusting screw secured to the bulb mounting and rotatably carried by the bar, said screw being projected through said cover plate in concentric spaced relation to the margins of the aperture therein, and being provided with a circular flange outside of said cover plate extending radially beyond the margins of said aperture therein, for purposes described.

15. A surgical lamp comprising a casing, an annular rim at the front of the casing, a diametrically disposed bar supported by said rim, a translucent cover plate carried by the rim, an adjustably mounted bulb socket in said casing supported by said bar, a pin operatively connected to said socket at one end and having its other end extending into the interior of said bar, and an operating rod in said bar operatively connected at one end to said pin and having its other end projected through said annular rim, whereby movement imparted to said rod may be transmitted to said pin to change the position of said lamp socket in said casing and to vary the focus of said lamp.

16. A surgical lamp comprising a casing, an annular rim at the front of the casing, a diametrically disposed hollow bar supported by said rim, a translucent cover plate carried by the rim, an adjustably mounted bulb socket in said casing supported by said bar, an adjusting screw threaded to the socket and having an end extending into said bar, a gear on said screw interiorly of said bar, and a rotatable operating rod in said bar having a gear on its inner end in mesh with the gear on said screw, said rod being projected through said annular rim and having an operating knob disposed exteriorly thereof, whereby rotation imparted to said rod may be transmitted by said gears to said screw, to change the position of said bulb socket.

17. A surgical lamp comprising a casing, an annular rim at the front of the casing, a diametrically disposed hollow bar supported by said rim, an adjustably mounted bulb socket in the casing supported by the bar, a reciprocably mounted pin connected at its upper end to the socket mounting and having its lower end projecting into said bar, a bell crank lever pivotally mounted in said bar and having one of its arms operatively connected to said pin, and a threaded operating rod longitudinally disposed in said hollow bar and having its inner end connected in threaded engagement with the other arm of said bell crank, said rod having its outer end projected through said annular rim and having an operating knob connected thereto, whereby rotation of said rod will rock said bell crank and reciprocate said pin to change the position of the bulb socket, for the purposes described.

PATRICK A. NIRDLINGER.